US010720683B2

(12) United States Patent
Obasih et al.

(10) Patent No.: US 10,720,683 B2
(45) Date of Patent: Jul. 21, 2020

(54) BATTERY MODULE THERMAL MANAGEMENT FEATURES FOR INTERNAL FLOW

(71) Applicant: CPS Technology Holdings LLC, New York, NY (US)

(72) Inventors: Kem M. Obasih, Brookfield, WI (US); Richard M. DeKeuster, Racine, WI (US)

(73) Assignee: CPS Technology Holdings LLC, New York, NY (US)

( * ) Notice: Subject to any disclaimer, the term of this patent is extended or adjusted under 35 U.S.C. 154(b) by 929 days.

(21) Appl. No.: 14/502,876

(22) Filed: Sep. 30, 2014

(65) Prior Publication Data

US 2016/0093935 A1    Mar. 31, 2016

(51) Int. Cl.
*H01M 10/6563* (2014.01)
*H01M 10/613* (2014.01)
(Continued)

(52) U.S. Cl.
CPC ......... *H01M 10/6563* (2015.04); *B60L 50/64* (2019.02); *B60L 50/66* (2019.02); *B60L 58/26* (2019.02); *H01M 2/1077* (2013.01); *H01M 2/12* (2013.01); *H01M 10/0525* (2013.01); *H01M 10/613* (2015.04); *H01M 10/625* (2015.04); *H01M 10/6555* (2015.04);
(Continued)

(58) Field of Classification Search
CPC ................................................. H01M 10/6563
See application file for complete search history.

(56) References Cited

U.S. PATENT DOCUMENTS 5,215,834 A    6/1993  Reher et al.
5,385,793 A    1/1995  Tiedemann et al.
(Continued)

FOREIGN PATENT DOCUMENTS

AU    2010273997 A1    2/2012
CN       1808751 A    7/2006
(Continued)

OTHER PUBLICATIONS

PCT/US2015/037088 International Search Report and Written Opinion dated Oct. 13, 2015.
CN 201580057895.5 Office Action dated Apr. 15, 2019.

*Primary Examiner* — Barbara L Gilliam
*Assistant Examiner* — Nathanael T Zemui
(74) *Attorney, Agent, or Firm* — Boardman & Clark LLP (57) ABSTRACT

A battery module includes a housing having a top side, a bottom side, and an inside between the top side and the bottom side. The battery module also includes electrochemical cells disposed in one or more stacks in the inside of the housing. The electrochemical cells are spaced apart from each other to enable an airflow between the electrochemical cells. The battery module includes a fan on an outside of the housing and a hood disposed over the fan and configured to contact the housing to direct the airflow through an entry point into the inside of the housing. The battery module includes a vent fluidly coupling the inside and the outside of the housing. The vent vents the airflow from the inside of the housing to the outside of the housing. The battery module includes flow guide features configured to guide the airflow along the electrochemical cells.

20 Claims, 9 Drawing Sheets

(51) Int. Cl.
  *H01M 10/625* (2014.01)
  *H01M 10/0525* (2010.01)
  *H01M 2/12* (2006.01)
  *H01M 2/10* (2006.01)
  *H01M 10/6566* (2014.01)
  *H01M 10/6557* (2014.01)
  *H01M 10/6555* (2014.01)
  *B60L 50/64* (2019.01)
  *B60L 58/26* (2019.01)
  *B60L 50/60* (2019.01)
  *H01M 10/052* (2010.01)

(52) U.S. Cl.
  CPC ... *H01M 10/6557* (2015.04); *H01M 10/6566* (2015.04); *B60L 2240/545* (2013.01); *H01M 10/052* (2013.01); *H01M 2220/20* (2013.01); *Y02E 60/122* (2013.01); *Y02T 10/705* (2013.01); *Y02T 10/7011* (2013.01)

(56) References Cited

U.S. PATENT DOCUMENTS

| | | | |
|---|---|---|---|
| 5,449,571 A | 9/1995 | Longardner et al. | |
| 5,585,204 A | 12/1996 | Oshida et al. | |
| 5,721,064 A | 2/1998 | Pedicini et al. | |
| 6,459,580 B1 | 10/2002 | Della Fiora et al. | |
| 6,468,150 B1 | 10/2002 | Langdon et al. | |
| 6,566,005 B1 | 5/2003 | Shimma et al. | |
| 6,628,521 B2 | 9/2003 | Gustine et al. | |
| 6,781,830 B2 | 8/2004 | Barth et al. | |
| 6,798,663 B1 | 9/2004 | Rubenstein | |
| 6,808,834 B2 | 10/2004 | Koschany | |
| 6,866,544 B1 | 3/2005 | Casey et al. | |
| 6,949,309 B2 | 9/2005 | Moores, Jr. et al. | |
| 7,112,387 B2 | 9/2006 | Kimoto et al. | |
| 7,172,831 B2 | 2/2007 | Jaura et al. | |
| 7,189,473 B2 | 3/2007 | Smith et al. | |
| 7,304,844 B2 | 12/2007 | Jan et al. | |
| 7,326,490 B2 | 2/2008 | Moores, Jr. et al. | |
| 7,357,135 B2 | 4/2008 | Cunningham | |
| 7,371,965 B2 | 5/2008 | Ice | |
| 7,388,745 B2 | 6/2008 | Deluga et al. | |
| 7,405,932 B2 | 7/2008 | Vinson et al. | |
| 7,414,841 B2 | 8/2008 | Chen et al. | |
| 7,447,028 B2 | 11/2008 | Lai et al. | |
| 7,558,061 B2 | 7/2009 | Franz et al. | |
| 7,560,190 B2 | 7/2009 | Ahn et al. | |
| 7,572,549 B2 | 8/2009 | Wegner | |
| 7,618,740 B2 | 11/2009 | Hamada et al. | |
| 7,642,003 B2 | 1/2010 | Ahn et al. | |
| 7,654,351 B2 | 2/2010 | Koike et al. | |
| 7,736,792 B2 | 6/2010 | Moores, Jr. et al. | |
| 7,746,003 B2 | 6/2010 | Lee et al. | |
| 7,746,034 B2 | 6/2010 | Lee et al. | |
| 7,794,871 B2 | 9/2010 | Kim | |
| 7,867,663 B2 | 1/2011 | Park et al. | |
| 7,947,387 B2 | 5/2011 | Saito et al. | |
| 7,968,223 B2 | 6/2011 | Lee et al. | |
| 7,974,098 B2 | 7/2011 | Oki et al. | |
| 7,984,943 B2 | 7/2011 | Iwano et al. | |
| 7,987,939 B2 | 8/2011 | Kisiler et al. | |
| 8,003,245 B2 | 8/2011 | Lee et al. | |
| 8,035,973 B2 | 10/2011 | McColloch | |
| 8,042,637 B2 | 10/2011 | Nagata et al. | |
| 8,080,972 B2 | 12/2011 | Smith | |
| 8,081,470 B2 | 12/2011 | Oki et al. | |
| 8,084,156 B2 | 12/2011 | Okuda et al. | |
| 8,085,538 B2 | 12/2011 | Noshadi et al. | |
| 8,096,136 B2 | 1/2012 | Zheng | |
| 8,197,958 B2 | 6/2012 | Gaben et al. | |
| 8,394,521 B2 | 3/2013 | Umemoto et al. | |
| 8,399,118 B2 | 3/2013 | Gadawski et al. | |
| 8,440,339 B2 | 5/2013 | Harada et al. | |
| 8,459,343 B2 | 6/2013 | Hung et al. | |
| 8,475,953 B2 | 7/2013 | Chew et al. | |
| 8,492,019 B2 | 7/2013 | Klaus et al. | |
| 8,507,122 B2 | 8/2013 | Saito et al. | |
| 8,518,568 B2 | 8/2013 | Dougherty et al. | |
| 8,530,069 B2 | 9/2013 | Wood et al. | |
| 8,609,268 B2 | 12/2013 | Fuhr et al. | |
| 8,617,735 B2 | 12/2013 | Lee et al. | |
| 8,642,204 B2 | 2/2014 | Higashino et al. | |
| 8,647,762 B2 | 2/2014 | Schwab et al. | |
| 8,652,678 B2 | 2/2014 | Musetti | |
| 8,663,829 B2 | 3/2014 | Koetting et al. | |
| 8,685,556 B2 | 4/2014 | Minokawa | |
| 8,685,558 B2 | 4/2014 | Fuhrmann et al. | |
| 8,722,229 B2 | 5/2014 | Haussmann | |
| 8,734,975 B2 | 5/2014 | Burrows et al. | |
| 8,739,856 B2 | 6/2014 | Fedorov | |
| 8,758,924 B2 | 6/2014 | Tennessen et al. | |
| 8,785,024 B2 | 7/2014 | Han et al. | |
| 8,785,025 B2 | 7/2014 | Sohn | |
| 8,785,026 B2 | 7/2014 | Hu et al. | |
| 8,785,027 B2 | 7/2014 | Soong et al. | |
| 9,564,663 B2 | 2/2017 | Kim et al. | |
| 2003/0211384 A1* | 11/2003 | Hamada | H01M 2/1077 429/120 |
| 2005/0008912 A1 | 1/2005 | Yang et al. | |
| 2005/0269995 A1 | 12/2005 | Donnelly et al. | |
| 2006/0093901 A1 | 5/2006 | Lee et al. | |
| 2006/0115720 A1 | 6/2006 | Kim | |
| 2006/0216595 A1 | 9/2006 | Cho | |
| 2007/0090810 A1* | 4/2007 | Dickinson | H01M 2/1077 320/150 |
| 2007/0248876 A1 | 10/2007 | Ahn et al. | |
| 2008/0003495 A1 | 1/2008 | Shimizu | |
| 2008/0280192 A1 | 11/2008 | Drozdz et al. | |
| 2008/0299448 A1 | 12/2008 | Buck et al. | |
| 2009/0135558 A1 | 5/2009 | Hughes | |
| 2009/0155675 A1 | 6/2009 | Houchin-Miller | |
| 2009/0155680 A1 | 6/2009 | Maguire et al. | |
| 2009/0253029 A1 | 10/2009 | Inoue | |
| 2010/0104927 A1 | 4/2010 | Albright | |
| 2011/0039142 A1 | 2/2011 | Kwag et al. | |
| 2011/0091759 A1 | 4/2011 | Song | |
| 2011/0104543 A1 | 5/2011 | Kim et al. | |
| 2011/0111273 A1 | 5/2011 | Okada et al. | |
| 2011/0135993 A1 | 6/2011 | An et al. | |
| 2011/0189522 A1 | 8/2011 | Kim | |
| 2011/0189525 A1 | 8/2011 | Palanchon et al. | |
| 2011/0229749 A1 | 9/2011 | Kim et al. | |
| 2011/0244291 A1 | 10/2011 | Sun | |
| 2011/0256431 A1 | 10/2011 | TenHouten et al. | |
| 2011/0311848 A1 | 12/2011 | Garascia et al. | |
| 2012/0082875 A1* | 4/2012 | Watanabe | H01M 2/1077 429/71 |
| 2012/0148881 A1 | 6/2012 | Quisenberry | |
| 2012/0237805 A1 | 9/2012 | Abels et al. | |
| 2013/0071706 A1 | 3/2013 | Lee | |
| 2013/0136955 A1 | 5/2013 | Chuang et al. | |
| 2013/0183571 A1 | 7/2013 | Miyazaki et al. | |
| 2013/0260194 A1 | 10/2013 | Meyer et al. | |
| 2014/0038010 A1 | 2/2014 | Ronning et al. | |
| 2014/0079974 A1 | 3/2014 | Schmidt et al. | |
| 2014/0113167 A1 | 4/2014 | Itoi et al. | |
| 2014/0154541 A1 | 6/2014 | Asakura et al. | |
| 2014/0186661 A1 | 7/2014 | Payne | |

FOREIGN PATENT DOCUMENTS

| | | |
|---|---|---|
| CN | 103608946 A | 2/2014 |
| EP | 2325920 A2 | 5/2011 |
| EP | 2372760 A2 | 10/2011 |
| WO | 2010099355 A2 | 9/2010 |
| WO | 2011060074 A2 | 5/2011 |
| WO | 2011077109 A1 | 6/2011 |
| WO | 2013186020 A1 | 12/2013 |

\* cited by examiner

BATTERY MODULE THERMAL MANAGEMENT FEATURES FOR INTERNAL FLOW

BACKGROUND

The present disclosure relates generally to the field of batteries and battery modules. More specifically, the present disclosure relates to Lithium-ion (Li-ion) battery modules having active thermal management features configured to enable an airflow on an inside of a housing of the battery module.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, traditional battery modules are susceptible to heating or overheating, which may negatively affect components of the battery module and electrochemical cells thereof. Further, thermal management features often increase a volume of the battery module without contributing to energy production, thereby reducing an energy density of the battery module.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure includes a battery module having a housing that includes a top side, a bottom side, and an inside extending between the top side and the bottom side. The battery module also includes electrochemical cells disposed in one or more stacks in the inside of the housing, where the electrochemical cells are spaced apart from each other to enable an airflow to flow between the electrochemical cells. Further, the battery module includes a fan disposed on an outside of the housing and a hood disposed over the fan and configured to contact the housing to direct the airflow from the fan through an entry point into the inside of the housing. The battery module also includes a vent fluidly coupling the inside of the housing to the outside of the housing and configured to vent the airflow from the inside of the housing to the outside of the housing. Further still, the battery module includes flow guide features configured to guide the airflow from the entry point along the electrochemical cells.

The present disclosure also relates to a battery module having a housing that includes a top side, a bottom side, a back side, a front side, and an inside at least partially bound by the top side, the bottom side, the back side, and the front side. The battery module also includes electrochemical cells disposed in one or more stacks in the inside of the housing from the bottom side of the housing to the top side of the housing, where gaps are provided between the electrochemical cells to enable an airflow to pass between the electrochemical cells. The battery module also includes a fan and an airflow guide configured to cooperate to direct the airflow through an entry point into the inside of the housing. Further, the battery module includes a vent fluidly coupling the inside of the housing to an outside of the housing and configured to vent the airflow from the inside of the housing to the outside of the housing. Further still, the battery module includes flow guide features configured to guide the airflow from the entry point along the electrochemical cells, where the flow guide features run along a length from a position proximate to the back side of the housing to a position proximate to the front side of the housing.

The present disclosure further relates to a battery module having a housing with a first side, a second side opposite the first side, and an inside between the first and second sides. The battery module includes electrochemical cells disposed in the inside of the housing in one or more stacks extending between the first side and the second side, where ribs of the housing provide gaps between the electrochemical cells. The battery module includes a fan disposed on an outside of the housing and configured to direct an airflow through an entry point into the inside of the housing. A vent of the battery module fluidly couples the inside of the housing to the outside of the housing to enable the airflow to travel from the entry point, to the vent, and to the outside of the housing. Further, the battery module includes flow guide features configured to guide the airflow along a length of the electrochemical cells between the entry point and the vent.

DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a housing and a number of battery cells (e.g., Lithium-ion (Li-ion) electrochemical cells) arranged within the housing to provide particular voltages and/or currents useful to power, for example, one or more components of an xEV. As another example, battery modules in accordance with present embodiments may be incorporated with or provide power to stationary power systems (e.g., non-automotive systems).

Aspects of battery modules in accordance with the present disclosure may increase in temperature during operation. For example, as an electrochemical cell of a battery module generates and/or provides power to the vehicle, the electrochemical cell (and surrounding features of the battery module) may become hot (e.g., relative to the temperature of the same features when the battery module is not operating). It is now recognized that certain features can limit such temperature increases in an efficient manner.

Indeed, battery modules in accordance with the present disclosure include thermal management features (e.g., active thermal management features) configured to enable an airflow on an inside of a housing of the battery module, thereby providing active internal thermal management. It should be noted that active internal thermal management, in accordance with the present disclosure, generally refers to airflow on an inside of the housing of the battery module configured to provide thermal management to electrochemical cells disposed in the inside of the housing. However, the active thermal management features themselves (e.g., fans or blowers) may be positioned on the inside or on an outside of the housing of the battery module. For example, a fan may be disposed on the outside of the battery module and configured to direct an airflow to the inside of the housing through one or more entry points of the housing. In accordance with present embodiments, the entry points may be on a top side, a bottom side, a back (e.g., lateral) side, a front (e.g., lateral) side, reinforcing (e.g., lateral) sides, or any other sides of the housing of the battery module.

Further, passive elements (e.g., flow guide extensions, flow guide inserts, flow redistribution extensions) may be included and may cooperate with active thermal management features to guide the airflow into the inside of the housing and guide the airflow to various areas on the inside of the housing (e.g., over, under, and between each of the electrochemical cells). Additionally, passive elements (e.g., flow guide extensions, flow guide inserts, flow redistribution extensions) may be configured to swirl or redistribute the airflow, thereby reducing a susceptibility to the airflow providing uneven (e.g., substantially heterogeneous) cooling to one or more of the electrochemical cells. Further still, water management features (e.g., sponge filters) may be included to filter the airflow such that the airflow does not contain water or other liquids. Additionally or alternatively, water management features (e.g., drains or recesses) may be configured to drain water or other liquids from the inside of the housing, or gather water or other liquids in an area on the inside of the housing away from the electrochemical cells.

Figure 1:
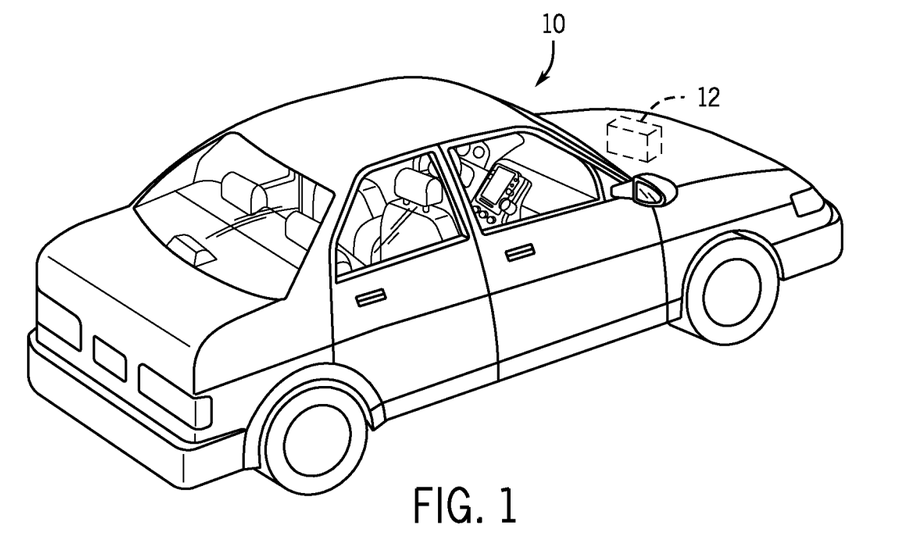
FIG. 1 is a perspective view of a vehicle having a battery system configured in accordance with present embodiments to provide power for various components of the vehicle.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
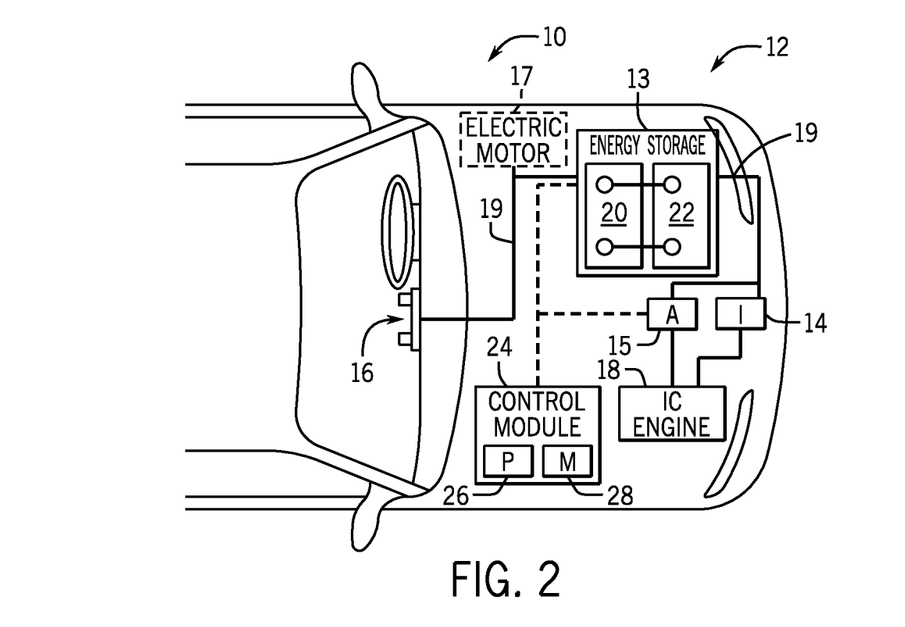
FIG. 2 is a cutaway schematic view of an embodiment of the vehicle and the battery system of FIG. 1.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) the internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 and a lead-acid (e.g., a second) battery module 22, which each includes one or more battery cells. In other embodiments, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

In some embodiments, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within energy storage component 13, the alternator 15, and/or the electric motor 17. For example, the control module 24 may regulate amount of electrical energy captured/supplied by each battery module 20 or 22 (e.g., to de-rate and re-rate the battery system 12), perform load balancing between the battery modules 20 and 22, determine a state of charge of each battery module 20 or 22, determine temperature of each battery module 20 or 22, control voltage output by the alternator 15 and/or the electric motor 17, and the like.

Accordingly, the control unit 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory 28 may include volatile memory, such as random access memory (RAM), and/or non-volatile memory, such as read-only memory (ROM), optical drives, hard disc drives, or solid-state drives. In some embodiments, the control unit 24 may include portions of a vehicle control unit (VCU) and/or a separate battery control module.

Figure 3:
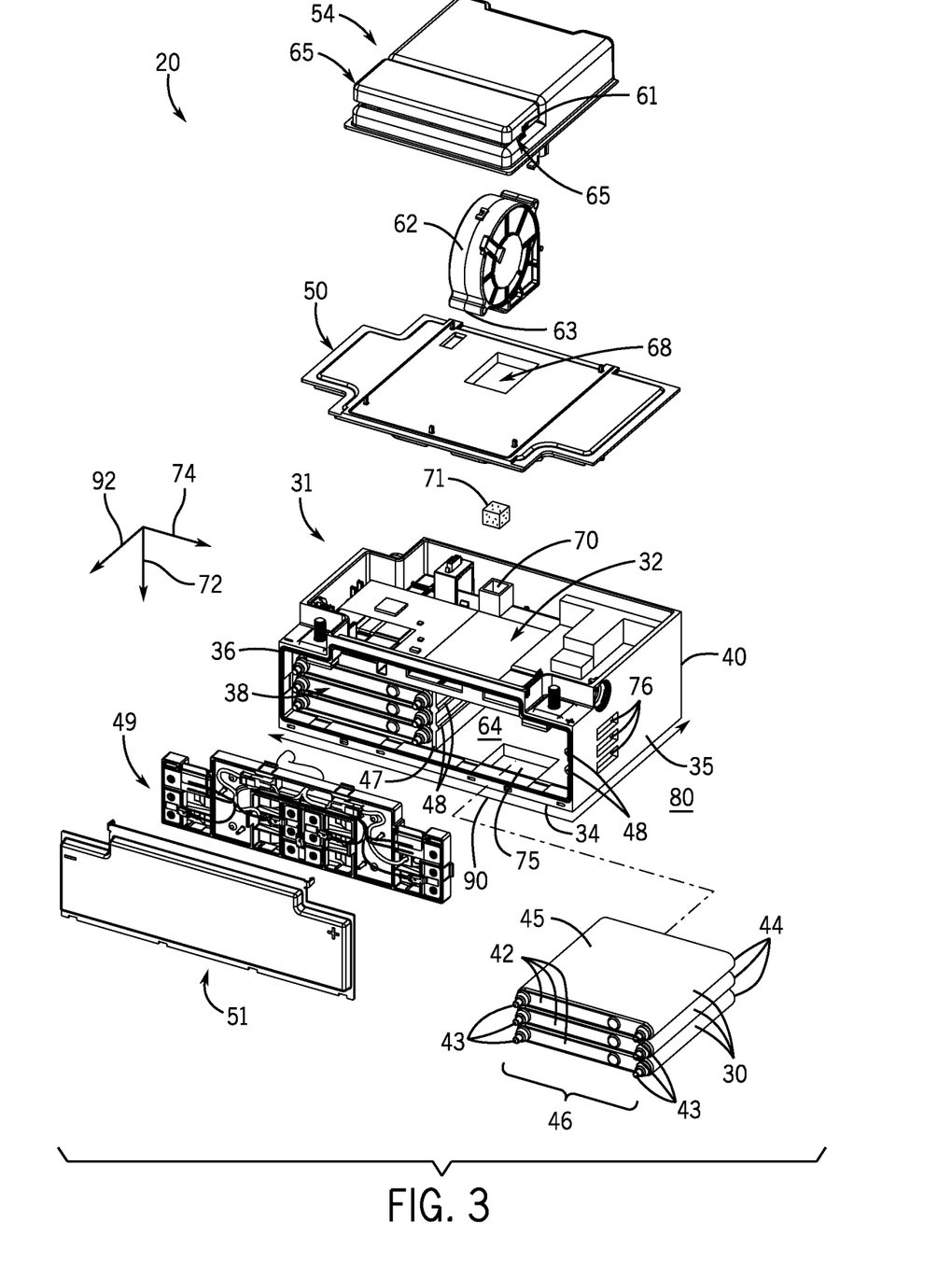
FIG. 3 is an exploded perspective view of an embodiment of a battery module for use in the vehicle of FIG. 1, in accordance with an aspect of the present disclosure.

An exploded perspective view of one embodiment of the lithium-ion (Li-ion) battery module 20, in accordance with the present disclosure, is shown in FIG. 3. In the illustrated embodiment, the battery module 20 includes a number of individual electrochemical cells 30 (e.g., Li-ion electrochemical cells) housed in a housing 31 of the battery module 20. The housing 31 includes a top side 32 (e.g., top wall), a bottom side 34 (e.g., bottom wall), and two reinforcing sides 35, 36 (e.g., reinforcing walls or reinforcing lateral sides). The housing 31 in the illustrated embodiment is open on a front side 38 (e.g., front lateral side) and closed on a back side 40 (e.g., back lateral side) of the housing 31. It should be noted that reference to the top side 32, the bottom side 34, the two reinforcing sides 35, 36, the front side 38, and the back side 40 in the illustrated embodiment may refer to an orientation of the battery module 20 (and, thus, the housing 31 thereof) within the vehicle 10. Other embodiments may include similar relative arrangements with respect to the components (e.g., the sides) of the housing 31, but may include a different positioning within the vehicle 10. In the illustrated embodiment, the electrochemical cells 30 are disposed into the housing 31 such that terminal ends 42 of the electrochemical cells 30 (e.g., having terminals 43) are proximate to the open front side 38 of the housing 31, and base ends 44 opposite to the terminal ends 42 are proximate to the back side 40 of the housing 31. Further, the electrochemical cells 30 are stacked (e.g., in two stacks 46 or columns), with broad faces 45 of the electrochemical cells 30 (e.g., broad faces 45 extending between the base ends 44 and the terminal ends 42) stacked proximate to each other (e.g., aligned with one another).

As shown in the illustrated embodiment, the housing 31 also includes a partition 47 configured to separate the two stacks 46 of electrochemical cells 30, where the partition 47 includes ribs or spacers 48 configured to separate (e.g., space) each electrochemical cell 30 from one another (e.g., each of the cells 30 in a single stack 46). In other words, the electrochemical cells 30 fit into slots defined by the ribs 48 of the partition 47, where the ribs 48 enable a space between adjacent electrochemical cells 30 in the stack 46. Further, ribs 48 may also be disposed above the top electrochemical cell 30 in each stack 46 and below the bottom electrochemical cell 30 in each stack 46, which enables a space between the uppermost electrochemical cell 30 and the top side 32 of the housing 31 and the lowermost electrochemical cell 30 and the bottom side 34 of the housing 31. Further, corresponding ribs 48 may be disposed on the inside of the two reinforcing sides 35, 36 to correspond (e.g., align) with the ribs 48 on the partition 47 for spacing the electrochemical cells 30 in each stack 46. In general, the space between adjacent electrochemical cells 30 (e.g., enabled by the ribs 48) enables coolant (e.g., air) to be routed between the electrochemical cells 30 to cool the electrochemical cells. The internal airflow will and corresponding active thermal management features will be described in detail below.

In the illustrated embodiment, the open front side 38 of the housing 31 may be at least partially closed by an e-carrier 49 of the housing 31, which is configured to establish electrical connections between the electrochemical cells 30 (e.g., by electrically coupling the terminals 43 of the electrochemical cells 30) and may also be configured to serve as a cover for the open front side 38 of the housing 31. An additional cover 51 may fit over the e-carrier 49 to fully enclose (e.g., seal) the housing 31 by fully covering the open front side 38.

Further, a top cover 50 of the battery module 20 may fit over the top side 32 of the housing 31. Certain components (e.g., control circuitry) of the battery module 20 may be disposed on top of the top side 32, between the top side 32 of the housing 31 and the top cover 50 of the battery module 20 that fits over the top side 32. Further still, a hood 54 of the battery module 20 may be disposed over the top cover 50 of the housing 31. A fan 62 may be disposed under the hood 54, between the hood 54 and the top cover 50 of the housing 31 (e.g., the top cover 50 disposed onto the top side 32 of the housing 31). The hood 54 may be used as an airflow guide to guide an airflow from the fan 62 to a particular area or areas of the housing 31. However, other airflow guides may be used in place of the illustrated hood 54. For example, a connecting conduit may be fluidly coupled between the fan 62 and a particular portion of the housing 31 intended to receive the airflow from the fan 62. Thus, the connecting conduit may act as an airflow guide to guide the airflow to particular areas of the housing 31.

In accordance with present embodiments, the fan 62 is configured to blow air into an inside 64 of the housing 31. For example, the fan 62 includes an air intake 63 that draws air into the fan 62 through one or more openings 61 in the hood 54. In the illustrated embodiment, the openings 61 are disposed on one or more side surfaces 65 of the hood 54. Disposing the opening(s) 61 on the side surface(s) 65 may reduce a likelihood that contaminants (e.g., dust or particles) fall into and under the hood 54 from above the hood 54 (e.g., due to gravity). In the illustrated embodiment, the fan 62 draws air into the fan 62 via the air intake 63 and blows the air through an entry point into the inside 64 of the housing 31. For example, in the illustrated embodiment, the fan 62 blows air toward a cover opening 68 in the top cover 50. The cover opening 68 may be fluidly coupled to a top side opening 70 disposed in the top side 32 of the housing 31, where the top side opening 70 is fluidly coupled to the inside 64 of the housing 31. Accordingly, air is blown from the fan 62, through the cover opening 68, and through the top side opening 70 into the inside 64 of the housing 31 of the battery module 20. Further, in the illustrated embodiment, one or more sponge filters 71 are disposed in either the cover opening 68 or the top side opening 70, or both, and are configured to extract water or other liquids or particles from the airflow generated by the fan 62.

As previously described, the electrochemical cells 30 are spaced via spacers 48 on the partition 47 separating the stacks 46 of electrochemical cells 30 and the corresponding spacers 48 disposed on the reinforcing sides 35, 36 (e.g., on the insides of the reinforcing sides 35, 36). Accordingly, air blown into the inside 64 of the housing 31 via the fan 62 is routed between, over, and/or under the electrochemical cells 30. Depending on the embodiment, air may also pass over the base ends 44 and/or terminal ends 42 of the electrochemical cells 30. Any fluid or water in the air flow on the inside 64 of the housing 31 may gather in a recess 75 disposed on the inside 64 of the housing 31 recessed into, for example, the bottom side 34 of the housing 31. However, any number of recesses 75 may be included to gather the water or other liquids, and the one or more recesses 75 may be disposed on any appropriate portion of the inside 64 of the housing 31.

In general, the air travels from the back side 40 of the housing 31 toward the front side 38 of the housing 31 and outwardly toward the reinforcing (e.g., lateral) sides 35, 36 of the housing 31, and exits the inside 64 of the housing 31 through vents 76 (e.g., slotted vents) disposed on the outsides of the reinforcing sides 35, 36. The vents 76 may be substantially aligned with the spaces between the electrochemical cells 30, but may be disposed on any portion of the reinforcing sides 35, 36. Further, some of the vents 76 may be aligned with the space above the top electrochemical cell 30 in each stack 46, and/or with the space below the bottom electrochemical cell 30 in each stack 46. Thus, all air that passes over or under each of the electrochemical cells 30 is enabled to vent from the inside 64 of the housing 31 to a surrounding environment 80 outside of the housing 31. Indeed, in general, the vents 76 provide access to lower outside pressures such that air in the housing 31 seeks the most direct path to the vents 76. Accordingly, flow guide features may be disposed in the inside 64 of the housing 31 to provide air distribution. For example, the guide features may enable the air to flow from the back side 40 toward the front side 38 before being pushed through the vents 76, which may enable more efficient and more even cooling of all of the electrochemical cells 30. The flow guide features will be discussed in detail below with reference to later figures. It should be noted that the vents 76 may include features (e.g., filters) that protect against contaminants entering the vents 76.

Disposing the fan 62 on the top cover 50 (e.g., above the top side 32) of the housing 31, as opposed to directly proximate to (or on) the back side 40 of the housing 31, may substantially reduce a footprint 90 of the battery module 20. For example, the footprint 90 of the battery module 20 may define the largest cross-sectional area of the battery module 20 with respect to a plane defined by directions 74 and 92 in the illustrated embodiment. A vehicle utilizing the battery module 20 may have a pre-defined (or allotted) space (e.g., surface area) on which the battery module 20 is to be positioned. The allotted surface area within the vehicle may be oriented substantially parallel with the footprint 90 of the battery module 20 such that the battery module 20 covers the allotted surface area from overhead. For example, the illustrated battery module 20 is disposed into the vehicle such that the illustrated footprint 90 aligns and corresponds with the allotted space in the vehicle. By disposing the fan 62 on the top cover 50 of the housing 31, and diverting the airflow to the inside 64 of the housing 31, the airflow extracts heat from the electrochemical cells 30 and does not contribute to the footprint 90. Disposing the fan 62 on other areas of the battery module 20 (e.g., on the back side 40 of the housing 31) would substantially increase the footprint 90 of the battery module 20.

Figure 4:
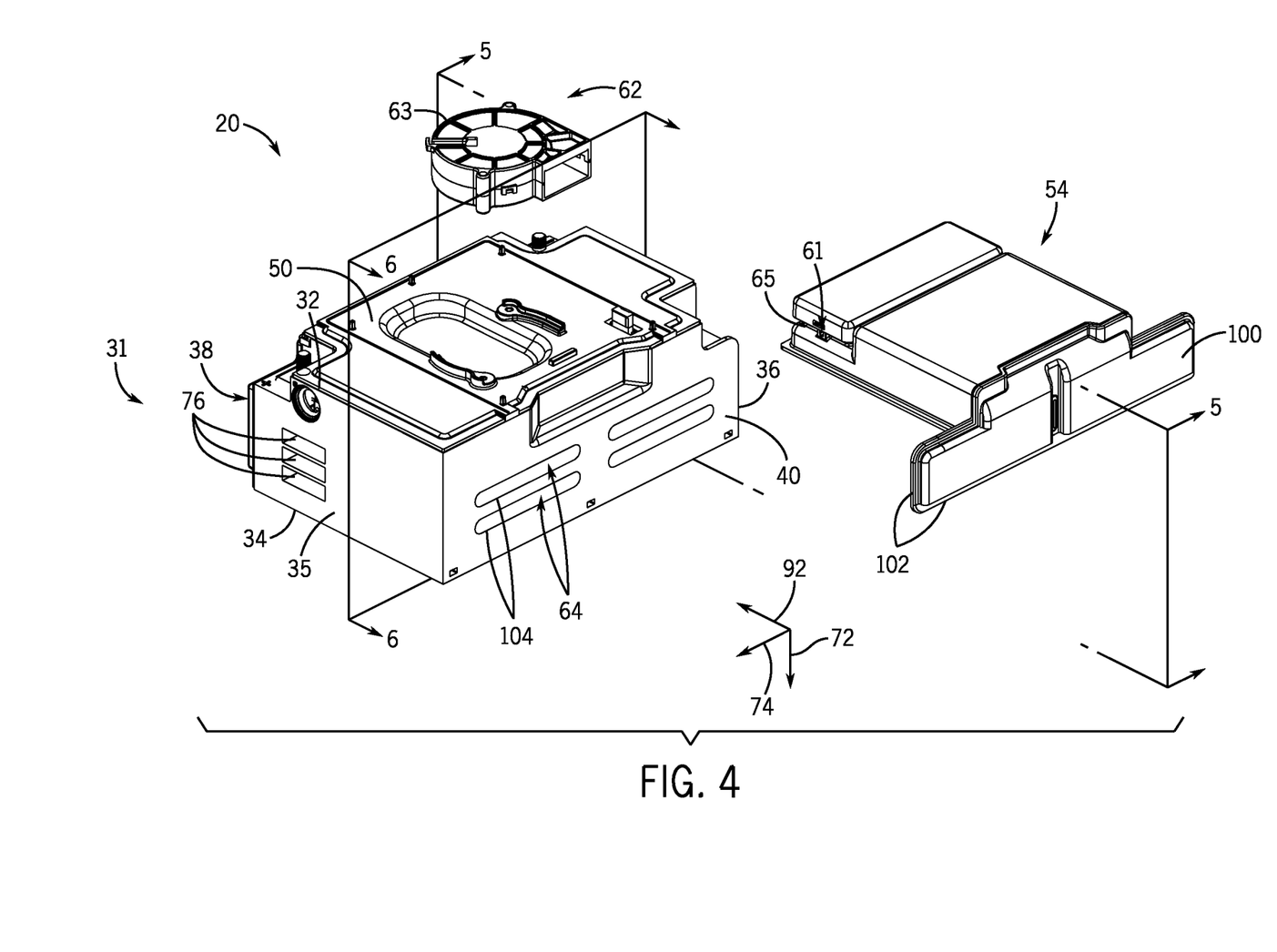
FIG. 4 is a partially exploded perspective view of an embodiment of a battery module for use in the vehicle of FIG. 1, in accordance with an aspect of the present disclosure.

The fan 62 in the illustrated embodiment is disposed on the top cover 50 over the top side 32 of the housing 31 and blows air through the cover opening 68 and the top side opening 70 into the inside 64 of the housing 31. However, in other embodiments, the fan 62 may blow air toward the back side 40 of the housing 31 and a flow diverting feature may divert the flow from the top side 32 (e.g., from the top cover 50 over the top side 32) of the housing 31, over a portion of the back side 40 of the housing 31, and into the inside 64 of the housing 31. For example, a partially exploded back perspective view of an embodiment of the battery module 20 is shown in FIG. 4. In the illustrated embodiment, the hood 54 is configured to extend over the fan 62 and contact the top cover 50 on the top side 32 of the housing 31 to substantially surround the fan 62. The hood 54 also includes an extension 100 configured to extend along the back side 40 of the housing 31 in direction 72. The extension 100 is configured to guide the airflow from the fan 62 downwardly in direction 72, along the back side 40 of the housing 31. The extension 100 also includes outer ridges 102 configured to contact (e.g., seal against) the back side 40 of the housing 31, such that air blown by the fan 62 and diverted along the back side 40 of the housing 31 is contained within the outer ridges 102. Further, one or more slots 104 are disposed in the back side 40 of the housing 31 to enable the air to flow into the inside 64 of the housing 31 through the slots 104. It should be noted that, although not shown in FIG. 4, a cooling plate may be disposed in the back side 40 of the housing 31 in some embodiments, where the cooling plate includes a material (e.g., metal) with a higher thermal conductivity than the material of the back side 40 of the housing 31. The cooling plate may be configured to extract heat from the electrochemical cells 30. Further, the cooling plate may be disposed on other sides of the housing 31, such as the reinforcing sides 35, 36 or the top side 32. The cooling plate may or may not cooperate with the airflow generated by the fan 62 to provide thermal management to the battery module 20

Continuing with the illustrated embodiment, the slots 104 are substantially aligned with the spaces between the electrochemical cells 30 disposed in the inside 64 of the housing 31, which may enable the air to pass directly to the spaces without being substantially interrupted by the base ends 44 of the electrochemical cells 30 disposed proximate to the back side 40 of the housing 31 (see FIG. 3). However, depending on the embodiment, the slots 104 may be disposed on any portion of the back side 40 that enables the slots 104 to pass the airflow from the back side 40 of the housing 31 into the inside 46 of the housing 31. Further, any number of slots 104 may be included in the back side 40 of the housing 31. For example, 1, 2, 3, 4, 5, 6, 7, 8 or more slots 104 may be disposed in the back side 40 of the housing 31 to fluidly couple to the inside 64 of the housing 31. Further still, the slots 104 may actually be smaller slots 104 disposed substantially in a middle portion of the back side 40 of the housing 31. For example, the slots 104 may be small openings in a middle portion of the back side 40 of the housing 31 disposed proximate to the partition 47 on the inside 64 of the housing 31. After the air is directed into the inside 64 of the housing 31 through the slots 104 on the back side 40 of the housing 31 (e.g., through a portion of an airflow path), the air is directed between the electrochemical cells 30 (e.g., through another portion of the airflow path) disposed on the inside 64 of the housing 31.

Figure 5:
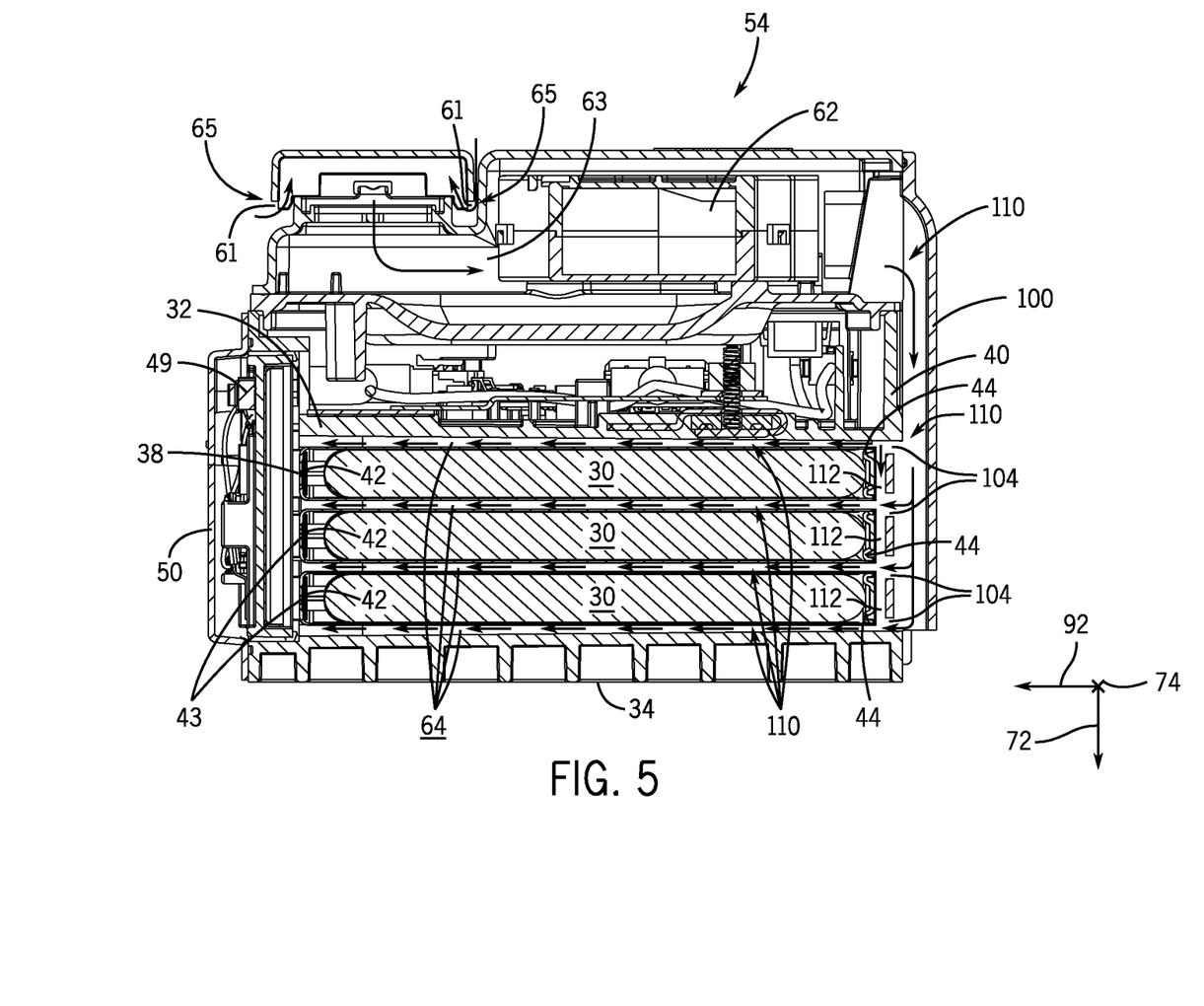
FIG. 5 is a cross-sectional side view of an embodiment of the battery module of FIG. 4 taken along line 5-5 and having an airflow path, in accordance with an aspect of the present disclosure.

For clarity, a cross-sectional side view of an embodiment of the battery module 20 having an airflow path 110 from the fan 62, along the back side 40 of the housing 31, and through the inside 64 of the housing 31 is shown in FIG. 5, taken along line 5-5 in FIG. 4. The portion of the airflow path 110 along the back side 40 of the housing 31 is fluidly coupled to the portion of the airflow path 110 on the inside 64 of the housing 31. In other words, as described above, the air flows through the airflow path 110 from the fan 62, along the back side 40 of the housing 31, through the slots 104 on the back side 40 of the housing 31, and into the inside 64 of the housing 31. However, as previously described, an entry point of the air into the inside 64 of the housing 31 may be through the top side 32 (e.g., through the top cover 50 and through the top side 32) of the housing 31 or at some other location, as opposed to through the illustrated slots 104.

In the illustrated embodiment, the back side 40 includes four slots 104 substantially aligned with portions of the airflow path 110 above and below each of the electrochemical cells 30 disposed on the inside 64 of the housing 31. The air is routed through the slots 104 and between the electrochemical cells 30, and exits through openings 76 (e.g., vents) in the reinforcing (e.g., lateral) sides 35, 36 of the housing 31. In the illustrated embodiment, the airflow also passes over the base ends 44 of the electrochemical cells 30 within a space 112 (e.g., of the airflow path 110) between the base ends 44 of the electrochemical cells 30 and the back side 40 of the housing 31 having the slots 104.

Figure 6:
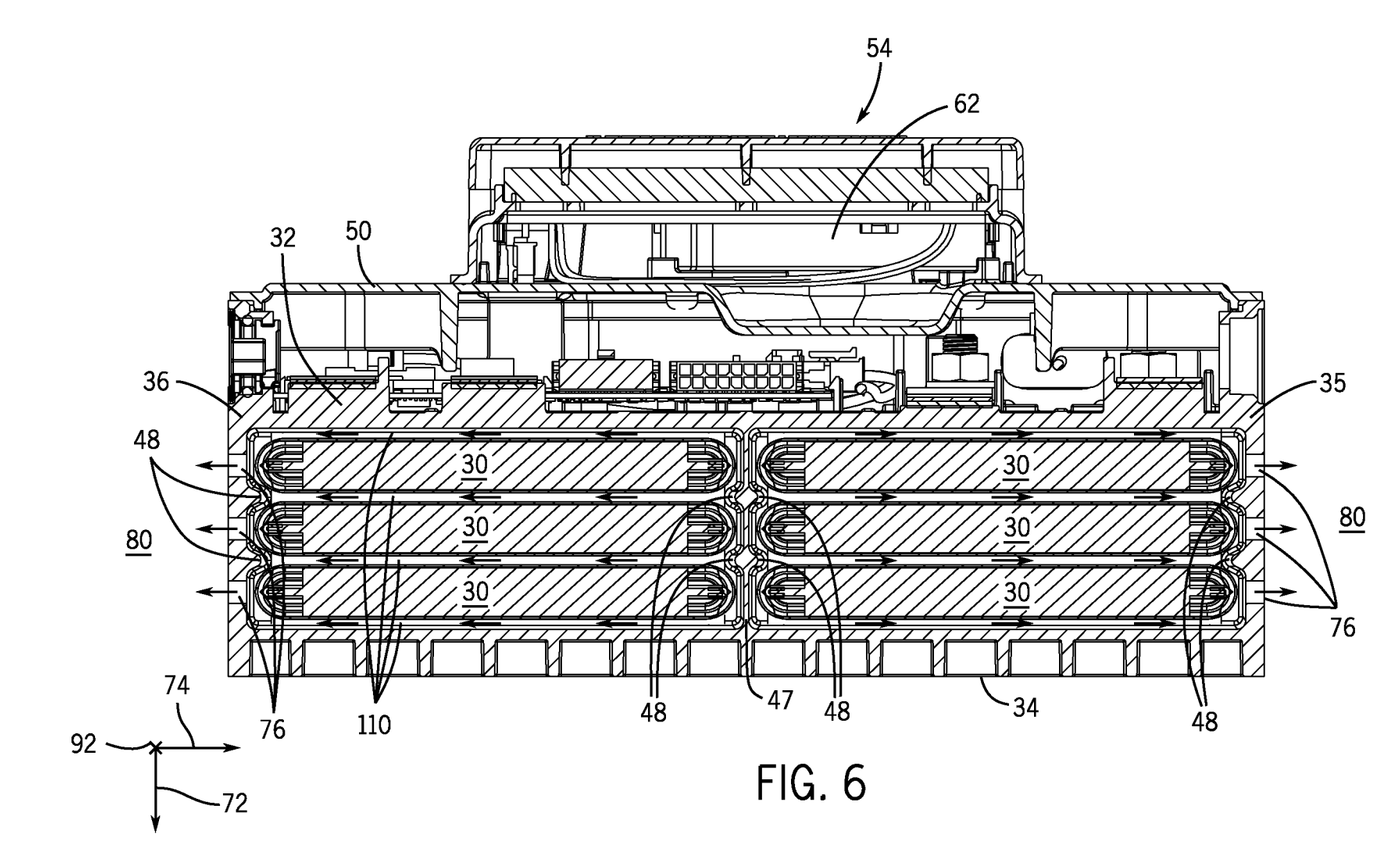
FIG. 6 is a cross-sectional side view of an embodiment of the battery module of FIG. 4 taken along line 6-6 and having an airflow path, in accordance with an aspect of the present disclosure.

To better show how the air is vented from the airflow path 110 on the inside 64 of the housing 31 to the surrounding environment 80, a front cross-sectional view of an embodiment of the battery module 20 having the airflow path 110 is shown in FIG. 6, taken along line 6-6 in FIG. 4. In the illustrated embodiment, the air is routed between the electrochemical cells 30 (e.g., in direction 92) and outwardly (e.g., parallel to direction 74) toward the reinforcing sides 35, 36. The reinforcing sides 35, 36 include the vents 76, as described with reference to FIG. 3, to vent the air from the airflow path 110 on the inside 64 of the housing 31 to the surrounding environment 80.

It should be noted that the vents 76 generally are disposed on a portion of the reinforcing sides 35, 36 proximate to the front side 38 of the housing 31 (as shown in FIG. 3). This may enable the air to flow over the electrochemical cells 30 from the back side 40 of the housing 31 toward the front side 38 of the housing 31 before being sucked through the vents 76 by the lower pressure in the surrounding environment 80, which may enable more even (e.g., homogenous) cooling of all of the electrochemical cells 30. However, in some embodiments, flow guide extension features may also help guide the air toward the front side 38 of the housing 31 before the air is vented through the vents 76. For example, internal surfaces on the inside 64 of the housing 31 may include the flow guide extension features configured to guide the air toward portions of the electrochemical cells 30 that may otherwise, in the absence of the flow guide extension features, not be cooled by the cooling air. In other words, without flow guide extension features configured to at least initially guide the airflow away from the vents 76 (e.g., such that the air contacts a larger portion of each electrochemical cell 30), the air may only contact small portions of certain of the electrochemical cells 30.

Figure 7:
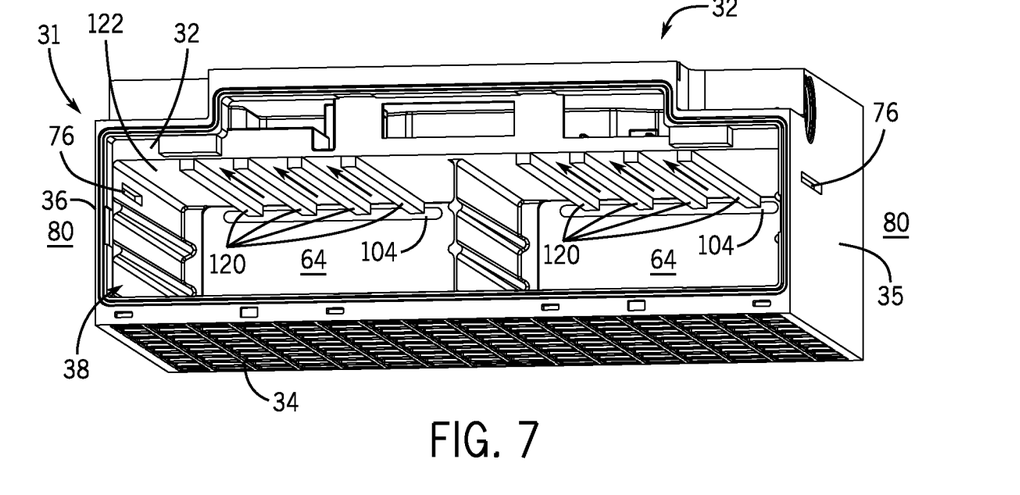
FIG. 7 is a perspective view of an embodiment of a housing having flow guide extension features for use in the battery module of FIG. 4, in accordance with an aspect of the present disclosure.

An embodiment of the housing 31 having flow guide extension features 120 configured to guide the airflow over the electrochemical cells 30 is shown in FIG. 7. In the illustrated embodiment, the housing 31 includes the extension features 120 on a top internal surface 122 on the top side 32 of the housing 31. The illustrated extension features 120 are configured to contact the uppermost electrochemical cell 30 (e.g., the broad face 45 of the uppermost electrochemical cell 30), thereby defining multiple airflow channels between the uppermost electrochemical cell 30, the top internal surface 122 on the top side 32 of the housing 31, and adjacent extension features 120. The multiple airflow channels guide the air entering into the inside 64 of the housing 31 (e.g., through the slot 104) toward the front side 38 of the housing 31. A cover would normally be disposed over the front side 38 of the housing 31, and the air would be directed along the front side 38 of the housing 31 toward the vent 76, which sucks the air toward the vent 76 (e.g., due to a pressure difference between the inside 64 of the housing 31 and the surrounding environment 80) and vents the air to the surrounding environment 80. In other words, the extension features 120 are configured to route the air from the back side 40 of the housing 31 (e.g., after passing through the slot 104) toward the front side 38 of the housing 31, where the air is then sucked through the vent 76 disposed on the reinforcing sides 35, 36 of the housing 31 to the surrounding environment 80. Without the extension features 120, the air may be sucked directly from the slot 104 to the vent 76, which would enable the air to exit the inside 64 of the housing 31 without contacting substantial portions of the electrochemical cells 30 disposed in the housing 31. In particular, portions of the electrochemical cells 30 proximate to the partition 47 and the front side 38 of the housing 31 may not be cooled by the air if not for the flow guide extension features 120 described above.

It should be noted that there may be any number of extension features 120 on the top internal surface 122 on the top side 32 of the housing 31. For example, 2, 3, 4, 5, 6, 7, 8, or more extension features 120 may be included. Further, each of the extension features 120 may extend a substantially equal distance from the back side 40 of the housing 31 toward the front side 38 of the housing 31, or the extension features 120 may extend different distances. For example, in some embodiments, each successive extension feature 120 (e.g., from the partition 47 outwardly) may extend a lesser distance (e.g., as measured from the back side 40 of the housing 31 toward the front side 38 of the housing 31) than the previous extension feature 120. In some embodiments, having extension features 120 all extending the same distance (e.g., from the back side 40 up to substantially the front side 38 of the housing 31) may enable adverse pressure drops in the inside 64 of the housing 31, causing back flow from the front side 38 of the housing 31 to the back side 40 of the housing 31. By tapering the distance of each successive flow guide extension feature 120 (e.g., successively from the partition 47 outwards), pressure differences between the slot 104 and the vent 76 may be managed to enable the air to flow over all portions of all of the electrochemical cells 30 substantially equally while blocking the back flow described above.

Figure 8:
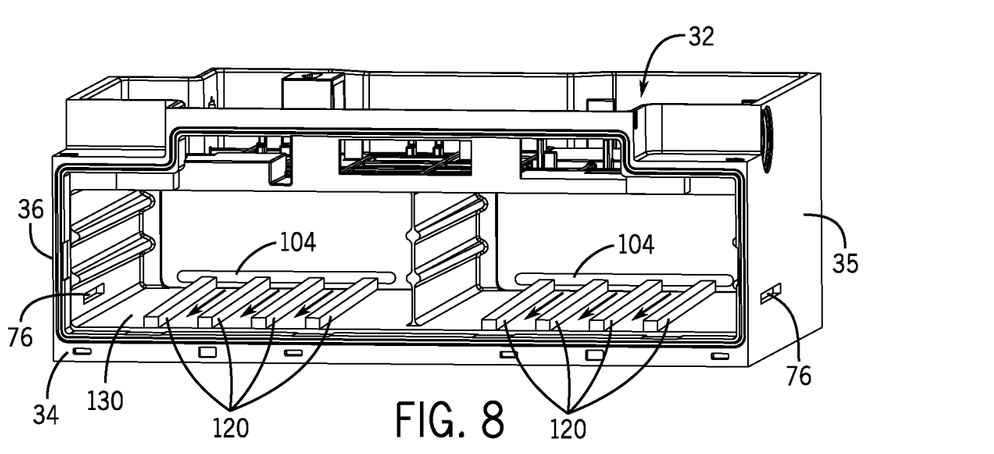
FIG. 8 is a perspective view of an embodiment of a housing having flow guide extension features for use in the battery module of FIG. 4, in accordance with an aspect of the present disclosure.

Further, in some embodiments, the same or similar types of extension features 120 are also disposed on other portions of the housing 31. For example, an embodiment of the housing 31 having extension features 120 disposed on a bottom internal surface 130 on the inside 64 of the bottom side 34 of the housing 31 and configured to guide the airflow under the lowermost electrochemical cell 30 (e.g., from the back side 40 to the front side 38 of the housing 31) is shown in FIG. 8. The extension features 120 on the bottom internal surface 130 of the bottom side 34 of the housing 31 operate in the same or a similar manner as those disposed on the top internal surface 122 in FIG. 7 and described with reference to FIG. 7, except that the extension features 120 on the bottom internal surface 130 engage the broad face 45 of the lowermost electrochemical cell 30 underneath the electrochemical cell 30.

Figure 9:
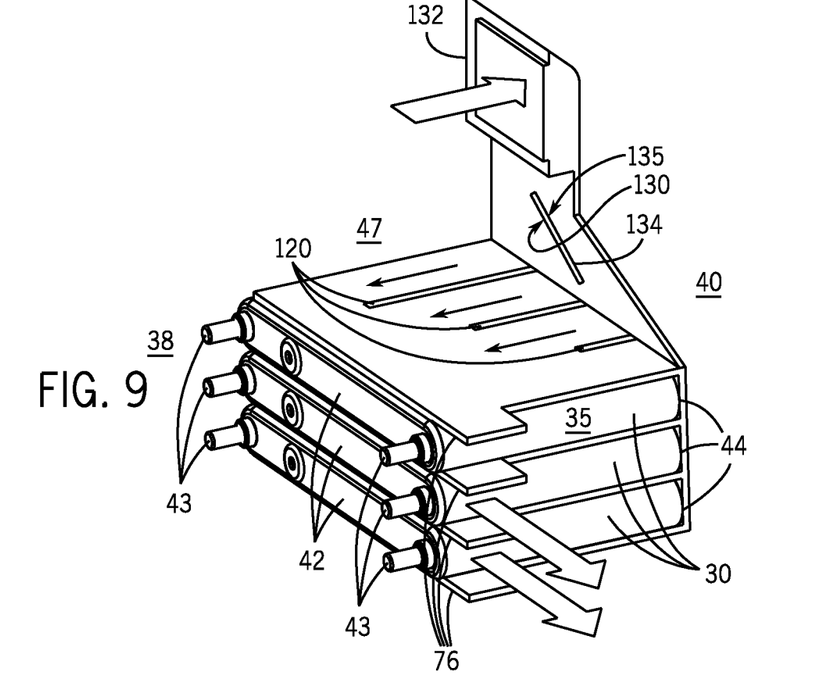
FIG. 9 is a schematic perspective view of an embodiment of airflow over, under, and between adjacent electrochemical cells for use in the battery module of FIG. 4, in accordance with an aspect of the present disclosure.

For clarity, a schematic perspective view of an embodiment of an air volume (e.g., of the airflow) over the electrochemical cells 30 is shown in FIG. 9. In the illustrated embodiment, the air enters an entry point 132 into the housing 31. As previously described, the entry point 132 may be through the top side 32 of the housing 31, as shown in FIG. 3, or through slots 104 on the back side 40 of the housing 31, as shown in FIG. 4. The flow guide extension features 120 then guide the air flow from the back side 40 of the housing 31 (e.g., proximate to the base ends 44 of the electrochemical cells 30) toward the front side 38 of the housing 31 (e.g., proximate to the terminal ends 42 of the electrochemical cells 30).

As previously described, the flow guide extension features 120 may successively (e.g., starting proximate to the partition 47 and working toward the reinforcing side 35) extend a lesser distance from the back side 40 toward the front side 38 of the housing 31. For example, in the illustrated embodiment, the entry point 132 and the vents 76 are disposed caddy-corner to one another (e.g., on diagonally opposing sides of the electrochemical cells 30. Accordingly, in the absence of the extension features 120, the airflow would naturally tend to flow from the entry point 132 diagonally across the electrochemical cells 30 to the vents 76. Thus, the flow guide extension features 120 are included to direct the airflow upwardly across the electrochemical cells 30. However, having flow guide extension features 120 that all extend the same distance (e.g., from the back side 40 of the housing 31 up to the front side 38 of the housing 31) may enable an adverse pressure drop that causes back flow from the front side 38 of the housing 31 to the back side 40 of the housing 31. By tapering the distance of each successive flow guide extension feature 120 (e.g., successively from the partition 47 outwards), as shown in the illustrated embodiment, the airflow travels along the extension features 120 and beyond tips of the extension features 120, and then angles directly toward the vents 76. The illustrated lengths of the extension features 120 enable the airflow to pass over all portions of the electrochemical cells 30. In other words, the pressure differences between the entry point (e.g., proximate to the base ends 44 of the electrochemical cells 30) and the vents 76 (in the reinforcing side 35) are managed, via the extension features 120, to enable the air to flow over all portions of all of the electrochemical cells 30 substantially equally and then vent through the vents 76 disposed in the reinforcing side 35.

Further, it should be noted that additional flow guide features may be disposed on other surfaces of the housing 31. For example, in the illustrated embodiment, a diagonal flow guide extension feature 134 is disposed upstream of the electrochemical cells 30. The diagonal flow guide extension 134 may be disposed in an airspace above the electrochemical cells 30. For example, an airspace may be located between the entry point 132 into the housing 31 and the electrochemical cells 30. The diagonal flow guide extension 134 may be disposed in said airspace, and may be configured to direct some of the air above 135 the diagonal flow guide extension 134 and some of the air below 136 the flow guide extension 134. The positioning of the diagonal flow guide extension 134 may vary within the airspace depending on expected pressure differences over various portions of the electrochemical cells 30.

Figure 10:
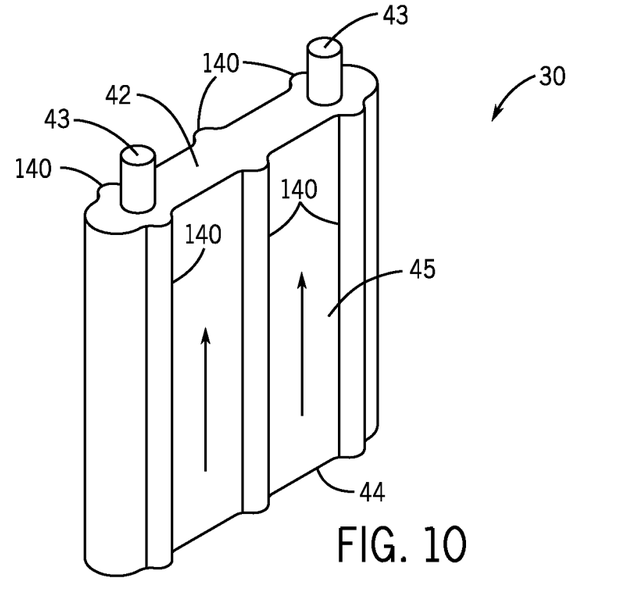
FIG. 10 is a perspective view of an embodiment of an electrochemical cell having flow guide features for use in the battery module of FIG. 4, in accordance with an aspect of the present disclosure.
Figure 11:
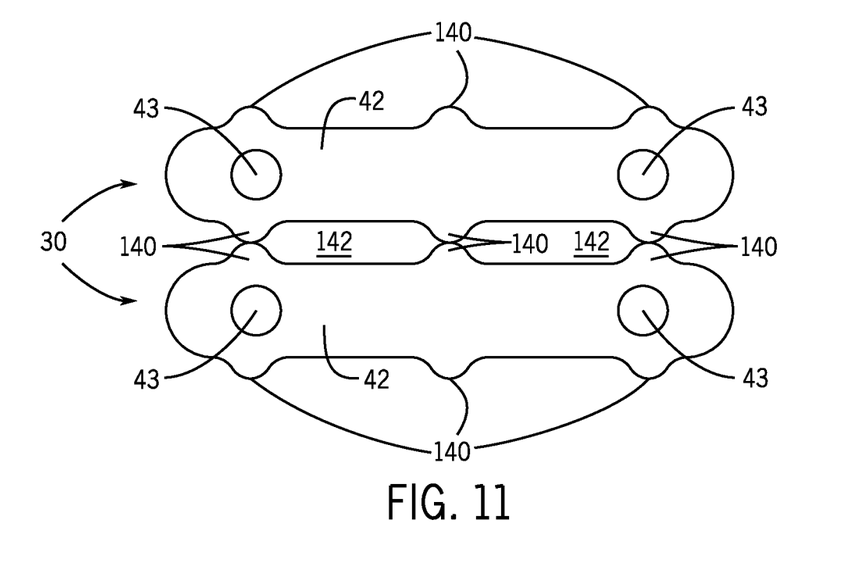
FIG. 11 is a schematic front view of the electrochemical cell of FIG. 10 having flow guide features engaged with flow guide features of an adjacent electrochemical cell, in accordance with an aspect of the present disclosure.

It should also be noted that additional guiding features may be disposed between adjacent electrochemical cells 30 as opposed to between one of the electrochemical cells 30 and one of the surfaces (e.g., top and bottom internal surfaces 122, 130) of the housing 31. For example, the electrochemical cells 30 themselves may include guiding features configured to guide the airflow from the slots 104 (or some other entry point into the inside 64 of the housing 31) at the back side 40 of the housing 31 toward the front side 38 of the housing 31. A perspective view of an embodiment of one electrochemical cell 30 having flow guide cell extension features 140 is shown in FIG. 10. In the illustrated embodiment, the flow guide cell extensions 140 are disposed on the broad faces 45 (e.g., bodies) of the electrochemical cell 30 and are configured to guide airflow from an area proximate to the base end 44 of the electrochemical cell 30 to an area proximate to the terminal end 42 (e.g., having terminals 43) of the electrochemical cell 30. In some embodiments, the electrochemical cell 30 may be otherwise disposed in the housing 31 such that the flow guide cell extensions 140 guide the air from the terminal end 42 toward the base end 44. The flow guide cell extensions 140 may contact an adjacent electrochemical cell 30 to define multiple fluid channels between the electrochemical cells 30 (e.g., where the multiple fluid channels are in fluid communication with the entry point into the housing 31 and to the vent(s) 76), or the flow guide cell extensions 140 may engage with the flow guide cell extensions 140 of the adjacent electrochemical cell 30 to define the multiple fluid channels. Further, if the electrochemical cell 30 is the top or bottom electrochemical cell 30 in the stack 46, the flow guide cell extensions 140 may interface with a surface of the housing 31 to enable guiding of the air along the electrochemical cell 30 in accordance with the above description. An embodiment of two adjacent electrochemical cells 30 having engaged flow guide cell extensions 140 is shown in a schematic front view in FIG. 11. Fluid channels 142 are defined between the engaged guide features 140.

Figure 12:
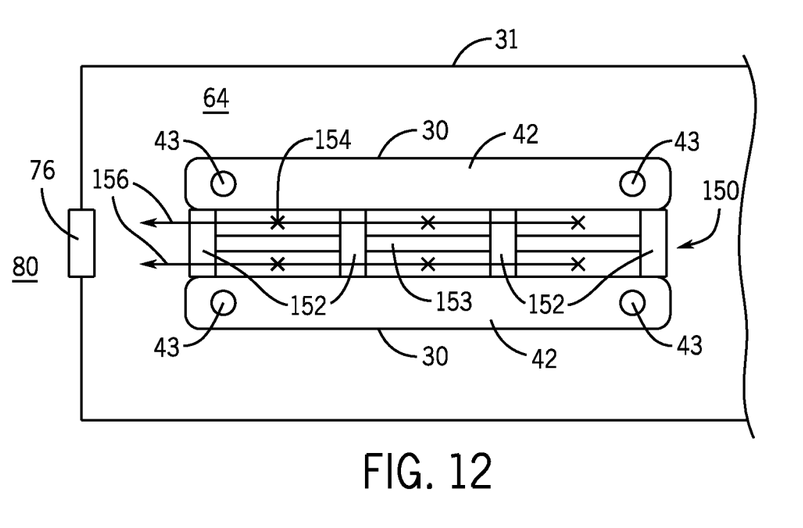
FIG. 12 is a schematic front view of an embodiment of a flow guide insert for use in the battery module of FIG. 4, in accordance with an aspect of the present disclosure.

In additional embodiments, inserts may include flow guide features and may be disposed between adjacent electrochemical cells 30 on the inside 64 of the housing 31, where the flow guide features of the inserts are configured to guide the flow of air between the electrochemical cells 30 from the back side 40 of the housing 31 (e.g, from the base end 44 of the electrochemical cell 30) toward the front side 38 of the housing 31 (e.g., toward the terminal end 42 of the electrochemical cell 30). A schematic front view of an embodiment of a flow guide insert 150 between two adjacent electrochemical cells 30 on the inside 64 of the housing 31 is shown in FIG. 12. In the illustrated embodiment, the flow guide insert 150 includes guide features 152 coupled to a thin connecting member 153 (e.g., thin connecting piece) of the flow guide insert 150 and configured to engage with the adjacent electrochemical cells 30. The thin connecting member 153 is disposed proximate to the base ends 44 of the electrochemical cells 30 (e.g., opposite to the illustrated terminal ends 42), and enables the air flow to pass over the thin connecting member 153 into multiple fluid channels defined in part by each pair of adjacent guide features 152. For example, each pair of adjacent guide features 152 contacts the adjacent electrochemical cells 30 to define a fluid channel through which the air flows toward the terminal ends 42 of the electrochemical cells 30 (e.g., indicated by x-arrows 154 toward the viewer). The channels fluidly couple the entry point into the inside 64 of the housing 31 and the vent(s) 76, but enable the airflow to pass over the electrochemical cells 30 before being vented. In other words, the guide features 152 block the air from simply being pushed out of the inside 64 of the housing 31 by the vent 76 before passing over the electrochemical cells 30, as previously described with reference to other disclosed guide features. Once the air has passed over the electrochemical cells 30 (e.g., beyond the terminal ends 42 of the electrochemical cells 30), the air may be sucked toward the vent 76, as shown by arrows 156. It should be noted that the flow guide inserts 150 may be utilized to space the electrochemical cells 30 instead of, or in addition to, the ribs 48 described with reference to FIG. 3.

Figure 13:
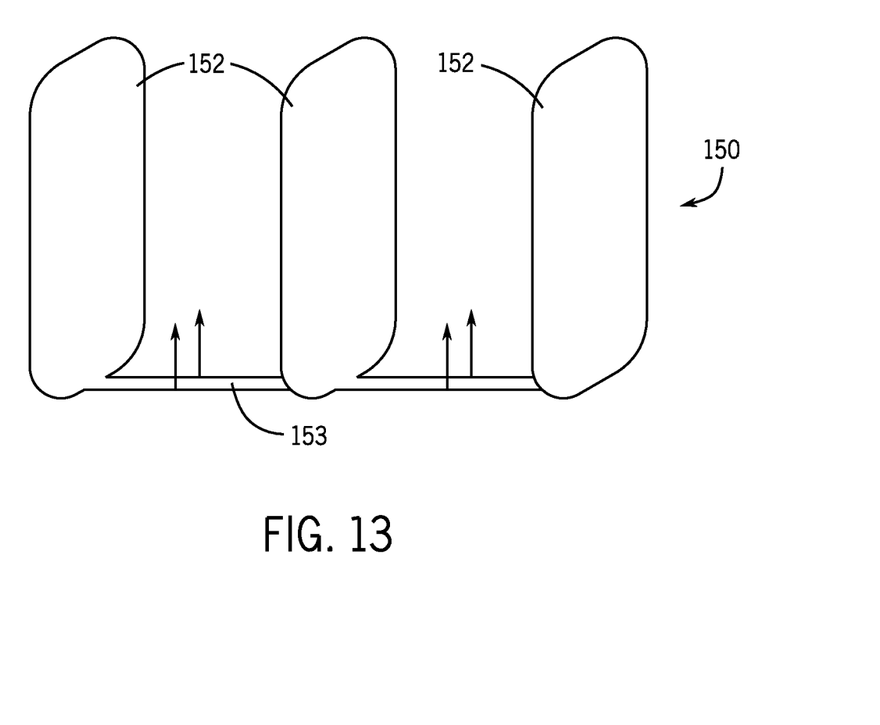
FIG. 13 is a schematic perspective view of an embodiment of a flow guide insert for use in the battery module of FIG. 4, in accordance with an aspect of the present disclosure.
Figure 14:
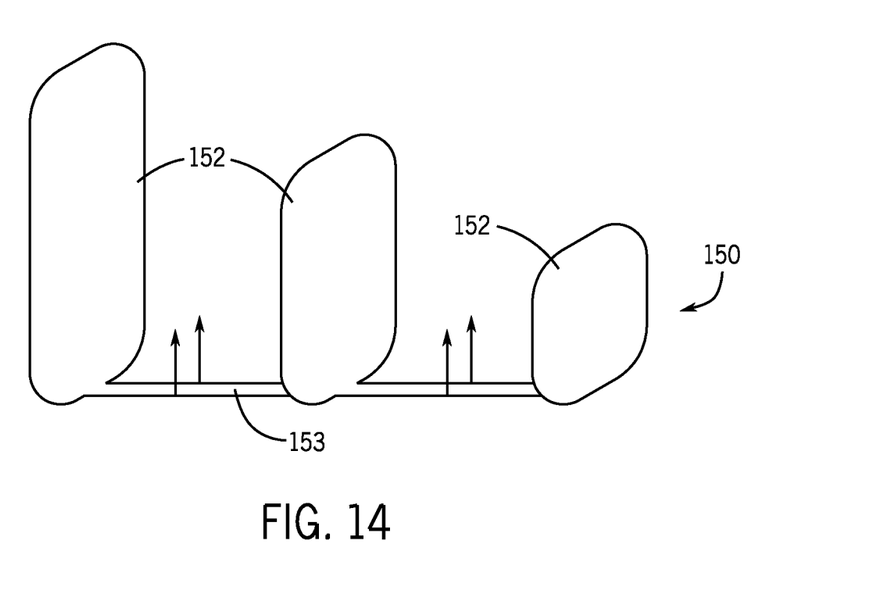
FIG. 14 is a schematic perspective view of an embodiment of a flow guide insert for use in the battery module of FIG. 4, in accordance with an aspect of the present disclosure.

It should be noted that the flow guide insert 150 may be configured similar to or other than what is shown in FIG. 12. For example, schematic perspective views of various embodiments of the flow guide insert 150 are shown in FIGS. 13 and 14.

One or more of the disclosed embodiments, alone or in combination, may provide one or more technical effects useful in the manufacture of battery modules, and portions of battery modules. In general, the disclosed battery modules include active thermal management features generally configured to enable fluid flow on an inside of a housing of the battery module. The active thermal management features themselves (e.g., a fan) may be disposed on an outer surface of the housing, which may reduce a footprint of the battery module, and may be configured to provide air flow that is directed (e.g., via flow diverting features) into the housing through an entry point on the housing (e.g., on a top or side surface of the housing). The flow may be directed by flow guide features (e.g., inserts between electrochemical cells and/or extensions of surfaces of the housing or electrochemical cells) configured to guide the flow proximate to various portions of the electrochemical cells, thereby providing a more even (e.g., substantially homogenous) heat extraction from all of the electrochemical cells and from all areas of the electrochemical cells. The technical effects and technical problems in the specification are exemplary and are not limiting. It should be noted that the embodiments described in the specification may have other technical effects and can solve other technical problems.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the disclosed subject matter. The order or sequence of any process or method steps may be varied or re-sequenced according to alternative embodiments. Furthermore, in an effort to provide a concise description of the exemplary embodiments, all features of an actual implementation may not have been described. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A battery module, comprising:
   a housing, comprising a top wall, a bottom wall, a back wall extending between the top wall and the bottom wall, and an inside positioned between the top wall and the bottom wall;
   electrochemical cells disposed in one or more stacks in the inside of the housing, wherein the electrochemical cells are spaced apart from each other to enable an airflow to flow between the electrochemical cells;
   a fan disposed on the top wall of the housing;
   a hood disposed over the fan and configured to contact the housing to direct the airflow from the fan into the inside of the housing through an entry point disposed on the back wall of the housing, wherein the entry point comprises slotted openings disposed through the back wall of the housing;
   a vent fluidly coupling the inside of the housing to an outside of the housing and configured to vent the airflow from the inside of the housing to the outside of the housing; and
   flow guide features configured to guide the airflow from the entry point along the electrochemical cells
   wherein the hood comprises an extension configured to extend from the top wall of the housing over the back wall of the housing, wherein the extension comprises outer ridges configured to seal against the back wall of the housing around the slotted openings, and wherein the extension is configured to guide the airflow from the fan on the top wall of the housing to the back wall of the housing and into the slotted openings disposed through the back wall of the housing.

2. The battery module of claim 1, wherein the flow guide features are flow guide extensions that extend from a top internal surface of the top wall of the housing, from a bottom internal surface of the bottom wall of the housing, or from both the top internal surface and the bottom internal surface.

3. The battery module of claim 1, wherein the flow guide features are flow guide cell extensions that extend from bodies of the electrochemical cells.

4. The battery module of claim 3, wherein the flow guide cell extensions of adjacent electrochemical cells are configured to engage with each other to form multiple fluid channels between the adjacent electrochemical cells, and the multiple fluid channels are fluidly coupled to the entry point and to the vent.

5. The battery module of claim 1, wherein the flow guide features are coupled to flow guide inserts disposed between adjacent electrochemical cells and the flow guide features engage with the adjacent electrochemical cells to form fluid channels between the adjacent electrochemical cells, and the fluid channels are fluidly coupled to the entry point and the vent.

6. The battery module of claim 5, wherein each flow guide insert comprises a thin connecting member and the flow guide features are coupled to the thin connecting member, such that the airflow is enabled to pass over the thin connecting member and between the adjacent flow guide features engaged with the adjacent electrochemical cells.

7. The battery module of claim 1, comprising a sponge filter disposed m the airflow upstream of the electrochemical cells, wherein the sponge filter is configured to remove particles from the airflow.

8. The battery module of claim 1, comprising a recess disposed on an internal surface of the bottom wall of the housing and the recess is configure to gather particles from the airflow.

9. The battery module of claim 1, wherein the flow guide features are configured to guide the airflow from the entry point proximate to the back wall of the housing toward the front wall of the housing.

10. The battery module of claim 9, wherein the vent is disposed in a reinforcing lateral wall of the housing closer to the front wall of the housing than to the back wall of the housing.

11. The battery module of claim 10, wherein the one or more stacks of the electrochemical cells extend upwardly from the bottom wall of the housing to the top wall of the housing, wherein base ends of the electrochemical cells are disposed proximate to the back wall of the housing and terminal ends of the electrochemical cells are disposed proximate to the front wall of the housing, wherein broad faces of the electrochemical cells extend between the base ends and the terminal ends of the electrochemical cells, wherein the flow guide features extend along the broad faces from proximate to the base ends of the electrochemical cells toward the terminal ends of the electrochemical cells, and wherein each successive flow guide feature, from proximate to the vent outwardly, extends a greater distance from proximate to the base ends of the electrochemical cells toward the terminal ends of the electrochemical cells.

12. The battery module of claim 1, wherein the housing does not comprise a cooling plate disposed on the housing proximate to the airflow generated by the fan.

13. A battery module, comprising:
a housing, comprising a top wall, a bottom wall, a back wall, a front wall, and an inside at least partially bound by the top wall, the bottom wall, the back wall, and the front wall;
electrochemical cells disposed in one or more stacks in the inside of the housing from the bottom wall of the housing to the top wall of the housing, wherein gaps are provided between the electrochemical cells to enable an airflow to pass between the electrochemical cells;
a fan disposed on the top wall of the housing and an airflow guide configured to cooperate with the fan to direct the airflow through an entry point disposed on the back wall of the housing, and into the inside of the housing;
a vent fluidly coupling the inside of the housing to an outside of the housing and configured to vent the airflow from the inside of the housing to the outside of the housing; and
flow guide features configured to guide the airflow from the entry point along the electrochemical cells, wherein the flow guide features run along a length from a position proximate to the back wall of the housing to a position proximate to the front wall of the housing;
a hood disposed over the fan and configured to contact the housing to direct the airflow from the fan into the inside of the housing through the entry point, wherein the entry point comprises slotted openings disposed through the back wall of the housing, and wherein the hood comprises an extension configured to extend from the top wall of the housing over the back wall of the housing, wherein the extension comprises outer ridges configured to seal against the back wall of the housing around the slotted openings, and wherein the extension is configured to guide the airflow from the fan on the top wall of the housing to the back wall of the housing and into the slotted openings disposed through the back wall of the housing.

14. The battery module of claim 13, wherein the flow guide features are flow guide extensions that extend from a top internal surface of the top wall of the housing, from a bottom internal surface of the bottom wall of the housing, or from both the top internal surface and the bottom internal surface.

15. The battery module of claim 13, wherein the flow guide features are flow guide cell extensions that extend from bodies of the electrochemical cells.

16. The battery module of claim 15, wherein the flow guide cell extensions of adjacent electrochemical cells are configured to engage with each other to form multiple fluid channels between the adjacent electrochemical cells, and the multiple fluid channels are fluidly coupled to the entry point and to the vent.

17. The battery module of claim 13, wherein the entry point disposed the back wall of the housing comprises slotted openings.

18. The battery module of claim 13, wherein the airflow guide is a hood configured to be disposed over the fan and to seal against the housing to direct the airflow through the entry point into the inside of the housing.

19. A battery module, comprising:
a housing having a first wall, a second wall opposite the first wall, a third wall extending between the first and second walls, and an inside disposed between the first, second, and third walls;
electrochemical cells disposed in the inside of the housing in one or more stacks wherein ribs of the housing provide gaps between the electrochemical cells;
a fan disposed on the first wall of the housing and configured to direct an airflow through an entry point disposed on the third wall of the housing, such that the airflow is directed into the inside of the housing;
a vent fluidly coupling the inside of the housing to an outside of the housing to enable the airflow to travel from the entry point, to the vent, and to the outside of the housing; and
flow guide features configured to guide the airflow along a length of the electrochemical cells between the entry point and the vent;
a hood disposed over the fan and configured to contact the housing to direct the airflow from the fan into the inside of the housing through the entry point, wherein the entry point comprises slotted openings and wherein the hood comprises an extension configured to extend from the top wall of the housing over the back wall of the housing, wherein the extension comprises outer ridges configured to seal against the back wall of the housing around the slotted openings, and wherein the extension is configured to guide the airflow from the fan on the top wall of the housing to the back wall of the housing and into the slotted openings disposed through the back wall of the housing.

20. The battery module of claim 19, wherein the entry point is disposed on the first wall of the housing or on a third wall of the housing extending between the first and second walls of the housing, and an airflow guide is configured to fluidly couple the fan and the entry point.

* * * * *

UNITED STATES PATENT AND TRADEMARK OFFICE
CERTIFICATE OF CORRECTION

Page 1 of 2

PATENT NO. : 10,720,683 B2
APPLICATION NO. : 14/502876
DATED : July 21, 2020
INVENTOR(S) : Obasih et al.

It is certified that error appears in the above-identified patent and that said Letters Patent is hereby corrected as shown below:

In the Specification

1. In Column 1, Line 34, delete "full hybrid systems (FHEVs)" and insert -- full hybrid electric vehicles (FHEVs) --, therefor.

2. In Column 1, Line 37, delete "mild hybrid systems (MHEVs)" and insert -- mild hybrid electric vehicles (MHEVs) --, therefor.

3. In Column 6, Line 5, delete "running More" and insert -- running. More --, therefor.

4. In Column 10, Line 30, delete "module 20" and insert -- module 20. --, therefor.

5. In Column 10, Line 41, delete "inside 46" and insert -- inside 64 --, therefor.

6. In Column 11, Line 11, delete "openings 76" and insert -- openings 61 --, therefor.

7. In Column 13, Line 14, delete "sides" and insert -- sides) --, therefor.

8. In Column 13, Line 43, delete "flow guide extension feature 134" and insert -- flow guide extension feature 120 --, therefor.

9. In Column 14, Line 33, delete "(e.g," and insert -- (e.g., --, therefor.

In the Claims

10. In Column 16, Line 6, in Claim 1, delete "cells" and insert -- cells, --, therefor.

11. In Column 16, Line 44, in Claim 7, delete "m" and insert -- in --, therefor.

Signed and Sealed this
Twenty-sixth Day of October, 2021

Drew Hirshfeld
*Performing the Functions and Duties of the
Under Secretary of Commerce for Intellectual Property and
Director of the United States Patent and Trademark Office*

12. In Column 18, Line 11, in Claim 17, delete "disposed the" and insert -- disposed on the --, therefor.